United States Patent [19]

Von Rymon Lipinski et al.

[11] 4,158,068

[45] Jun. 12, 1979

[54] SWEETENER MIXTURE

[75] Inventors: Gert-Wolfhard Von Rymon Lipinski; Erich Lück, both of Frankfurt am Main, Fed. Rep. of Germany

[73] Assignee: Hoechst Aktiengesellschaft, Frankfurt am Main, Fed. Rep. of Germany

[21] Appl. No.: 808,987

[22] Filed: Jun. 22, 1977

[30] Foreign Application Priority Data

Jun. 24, 1976 [DE] Fed. Rep. of Germany ....... 2628294

[51] Int. Cl.² ............................................ A23L 1/236
[52] U.S. Cl. ..................................... 426/548; 426/804
[58] Field of Search ................................ 426/548, 804

[56] References Cited

U.S. PATENT DOCUMENTS

| | | | |
|---|---|---|---|
| 2,784,100 | 3/1957 | Endicott et al. | 426/548 |
| 3,087,821 | 4/1963 | Horowitz et al. | 426/548 |
| 3,642,491 | 2/1972 | Schlatter | 426/548 |
| 3,689,486 | 9/1972 | Clauss et al. | 426/548 X |
| 3,780,189 | 12/1973 | Scott | 426/548 X |
| 3,926,976 | 12/1975 | Clauss et al. | 426/548 X |
| 3,976,790 | 8/1976 | Crosby et al. | 426/548 X |

*Primary Examiner*—Raymond N. Jones
*Assistant Examiner*—Esther M. Kepplinger
*Attorney, Agent, or Firm*—Curtis, Morris & Safford

[57] ABSTRACT

A sweetener mixture having an improved saccharose-like taste consisting of acetosulfame and at least one sweetener selected from the group of the aspartyl peptide esters, the sulfamate sweeteners, the sulfimide sweeteners and the dihydrochalcone sweeteners.

5 Claims, No Drawings

SWEETENER MIXTURE

It is known that artificial sweeteners have a sweetening power which is by far higher than that of natural sugars. Therefore they are advantageously used for the sweetening of food, beverages, animal feed, pharmaceuticals and cosmetics. All the sweeteners, however, have the disadvantage that they have a more or less strong after taste in higher concentrations. The flavor quality of the sweetness moreover diverges from that of sucrose, which serves as a standard for the evaluation of the sweetness, owing to the fact that people have got accustomed to it for a long time.

For covering the after taste, a number of various non-sweet additives, for example maltol, ethyl maltol, citric acid, tartaric acid or quinine sulfate have been added to sweeteners (cf. German Offenlegungsschrift No. 2,060,634). These agents have been proposed chiefly for covering the after taste of saccharin, which has certainly the strongest after taste.

It is further known that mixtures of sweeteners can be used for the sweetening of food, beverages, animal feed, pharmaceuticals and cosmetics. (Cf. for example German Auslegeschrift No. 1,961,769). The reason why sweetener mixtures are preferably used is the fact that their sweetening power is frequently strengthened synergistically, and thus an economy of matter, in comparison with pure sweeteners, can be attained.

A further reason why sweetener mixtures are used is the fact that the sweetening effect of some of the known sweeteners is evolved on the tongue only after a certain delay or that it sets in very rapidly, but fades rapidly, too. This disadvantage can be substantially compensated for by adding sweeteners which have a rather long lasting sweetening effect or optionally by adding natural sugars.

A known advantageous sweetener is acetosulfame, (generic name: acetosulfame-potassium salt), which is the potassium salt of 3,4-dihydro-6-methyl-1,2,3-oxathiazine-4-one-2,2-dioxide. Its sweetness is about 80 to 250 times that of saccharose (cane or beet sugar) [cf. table 1, page 143 of the journal "Chemie in unserer Zeit," No. 5 (1975)]. The sweetness of this sweetening agent is evolved very rapidly and fades only very slowly. The after taste is insignificant and can be noticed only in rather high concentrations. Thus acetosulfame could be suitably used alone for the sweetening of food, pharmaceuticals, cosmetics and animal feed. Nevertheless, it was desirable to improve especially its saccharose-like taste; acetosulfame is very sweet, like all the other synthetic sweeteners, but its quality of sweet taste differs from that of saccharose. The sweet taste of saccharose, however, sets the standard for the evaluation of all sweeteners, as has been mentioned above.

The task of the present invention was, consequently, to improve the saccharose-like taste of acetosulfame.

This task could be solved according to the invention by mixing acetosulfame with further known artificial sweeteners. The present invention, consequently, relates to a sweetener mixture having an improved saccharose-like taste and consisting of (a) acetosulfame and
(b) at least a further artificial sweetener, selected especially from the class of the aspartyl peptide esters, the sulfamate sweeteners, the sulfimide sweeteners and the dihydrochalcone sweeteners.

Acetosulfame is, as it has been mentioned, a potassium salt.

In principle it could be replaced by other non-toxic water-soluble salts, especially the sodium and calcium salt of 3,4-dihydro-6-methyl-1,2,3-oxathiazine-4-one-2,2-dioxide, but these salts do not bring about any advantages in comparison with the potassium salt.

The most important representatives of the sweetener classes mentioned sub (b) are mainly the aspartyl phenyl alanine methyl ester (an aspartyl peptide ester) and the non-toxic water-soluble salts, especially the sodium and calcium salt, of cyclohexyl sulfamic acid (sulfamate sweeteners), saccharin and its non-toxic water-soluble salts, especially saccharin-Na (sulfimide sweeteners), and the neohesperidin and naringine dihydrochalcones as well as their non-toxic water-soluble salts (dihydrochalcone sweeteners). The term "non-toxic water-soluble salts" is intended primarily to mean the Na-, K-, $NH_4$ and Ca-salts. One or more of these sweetener types may be mixed with acetosulfame; preferably, however, only one sweetener is used.

The components of the mixture (a) and (b) can be mixed in any possible ratio; however, they are preferably mixed in an ratio inverse to their sweetening powers. The sweetening powers are generally determined in comparison with saccharose, for example, in the manner described in the journal "Chemie in unserer Zeit," pages 142–145 (1975). The following weight ratios of the sweetener components have found to be advantageous:

acetosulfame/aspartyl phenyl alanine methyl ester in a ratio of 1:10 to 10:1, especially of about 2:5 to 5:2 acetosulfame/sodium cyclamate in a ratio of about 3:1 to 1:12, especially of about 1:2 to 1:12 acetosulfame/saccharin-Na in a ratio of about 1:2 to 10:1, especially of about 1:1 to 8:1 acetosulfame/neohesperidin-dihydrochalcone in a ratio of about 5:1 to 20:1, especially of about 8:1 to 15:1.

The concentrations of the sweetener preparation to be used, for example in food, beverages, etc. depend on the requirements in each case.

It is extremely surprising that the sweetener mixture according to the invention makes it possible to improve just the saccharose-like sweet taste of acetosulfame, since this effect had not been observed or described for mixtures of other known sweeteners with one another. When mixing the other known sweeteners with one another, the sweetness may be modified or strengthened, or the after-taste may be reduced. Owing to its special flavor improvement the present invention represents a considerable progress in the field of the artificial sweeteners.

The invention will be illustrated in the following examples.

In the examples each time 10 test persons had to evaluate different sweetener solutions, the sweetness of which corresponded each time to a 6% saccharose solution. A part of the test solutions to be taken with closed eyes contained only the pure sweeteners, the other part contained a sweetener mixture according to the invention. The results obtained are listed in the examples.

EXAMPLE 1

The test substance was a mixture of acetosulfame and aspartyl phenyl alanine methyl ester. The solutions prepared for the test, the sweetness of which corresponded to about 6% saccharose solutions, contained the following sweetener amounts:

| | |
|---|---|
| pure acetosulfame solution | 650 mg/l |
| pure aspartyl phenyl-alanine methyl ester solution | 650 mg/l |
| solution of a mixture of acetosulfame and aspartyl phenyl alanine methyl ester in a ratio of 1:1 | 350 mg/l |
| test result: | |
| saccharose-like taste of the mixture | number of evaluations |
| better than that of pure sweetener solutions | 16 |
| equal to that of pure sweetener solutions | 1 |
| worse than that of pure sweetener solutions | 3 |

The sweet flavor of the solutions of the sweetener mixture is pleasant to the taste for concentrations in the range from about 100 to 800 mg, preferably from about 200 to 500 mg of the mixture per liter.

EXAMPLE 2

A mixture of acetosulfame and sodium cyclamate was tested. The solutions prepared for the test contained the following sweetener amounts:

| | |
|---|---|
| pure acetossul fame solution | 650 mg/l |
| pure Na-cyclamate solution | 1,750 mg/lη |
| solution of the mixture of acetosulfame and Na-cyclamate in a ratio of 1:5 | 960 mg/l |
| test result: | |
| saccharose-like taste of the mixture | number of evaluations: |
| better than that of pure sweetener solutions | 15 |
| equal to that of pure sweetener solutions | 3 |
| worse than that of pure sweetener solutions | 2 |

The sweetness of the solutions is pleasant to the taste for a concentration of the sweetener mixture in the range from about 300 to 2,500 mg, especially from about 600 to 1,800 mg per liter.

EXAMPLE 3

The test substance was a mixture of acetosulfame and saccharin-Na. The solutions prepared for the test contained the following sweetener amounts:

| | |
|---|---|
| pure acetosulfame solution | 650 mg/l |
| pure saccharin-Na solution | 170 mg/l |
| solution of the mixture of acetosulfame and saccharin-Na in a ratio of 5:2 | 410 mg/l |
| test result: | |
| sachharose-like taste of the mixture | number of evaluations |
| better than that of pure sweetener solutions | 15 |
| equal to that of solutions of pure sweeteners | 3 |
| worse than that of solutions of pure sweeteners | 2 |

The sweetness of the solutions is pleasant to the taste for concentrations in the range from about 300 to 2,500 mg, especially from about 600 to 1,800 mg per liter.

EXAMPLE 4

The test substance was a mixture of acetosulfame and neohesperidin-dihydrochalcone. The solutions prepared for the test contained the following sweetener amounts:

| | |
|---|---|
| pure acetosulfame solution | 650 mg/l |
| pure neohesperidin/dihydrochalcone solution | 60 mg/l |
| solution of the mixture consisting of acetosulfame and neohesperidin dihydrochalcone in a ratio of 10:1 | 115 mg/l |
| test result: | number of evaluations: |
| saccharose-like taste of the mixture | |
| better than that of pure sweetener solution: | 17 |
| equal to that of pure sweetener solutions | 3 |
| worse than that of pure sweetener solutions | 0 |

The sweetness of the solutions of the sweetener mixture is pleasant to the taste for concentrations of the sweetener mixture in a range from about 40 to 300 mg, especially from about 80 to 200 mg per liter.

What is claimed is:

1. A sweetener mixture having an improved saccharose-like taste and consisting of
   (a) the potassium salt of 3,4-dihydro-6-methyl-1,2,3-oxathiazine-4-one-2,2-dioxide and
   (b) a further sweetener selected from the group consisting of
   (i) aspartyl phenyl-alanine methyl ester,
   (ii) the sodium salt of cyclohexyl sulfamic acid,
   (iii) the sodium salt of saccharin, and
   (iv) neohesperidin-dihydrochalcone,
   wherein the ratio by weight of (a) to (b) in such a mixture is from 1:10 to 10:1 for sweetener (b) (i), 3:1 to 1:12 for sweetener (b) (ii), 1:2 to 10:1 for sweetener (b) (iii), and 5:1 to 20:1 for sweetener (b) (iv).

2. A sweetener mixture as in claim 1 wherein said further sweetener is (b) (i) and wherein the ratio by weight of (a) to (b) (i) in such a mixture is from 2:5 to 5:2.

3. A sweetener mixture as in claim 1 wherein said further sweetener is (b) (ii) and wherein the ratio by weight of (a) to (b) (ii) in such a mixture is from 1:2 to 1:12.

4. A sweetener mixture as in claim 1 wherein said further sweetener is (b) (iii) and wherein the ratio by weight of (a) to (b) (iii) in such a mixture is from 1:1 to 8:1.

5. A sweetener mixture as in claim 1 wherein said further sweetener is (b) (iv) and wherein the ratio by weight of (a) to (b) (iv) in such a mixture is from 8:1 to 15:1.

* * * * *

UNITED STATES PATENT AND TRADEMARK OFFICE

CERTIFICATE EXTENDING PATENT TERM
UNDER 35 U.S.C. 156

Patent No.    : 4,158,068

Dated         : June 12, 1979

Inventor(s)   : Gert-Wolfhard Von Rymon Lipinski et al

Patent Owner  : Hoechst Aktiengesellschaft

This is to certify that there has been presented to the

COMMISSIONER OF PATENTS AND TRADEMARKS an application under 35 U.S.C. 156 for an extension of the patent term. Since it appears that the requirements of the law have been met, this certificate extends the term of the patent for the period of

2 YEARS with all rights pertaining thereto as provided by 35 USC 156 (b).

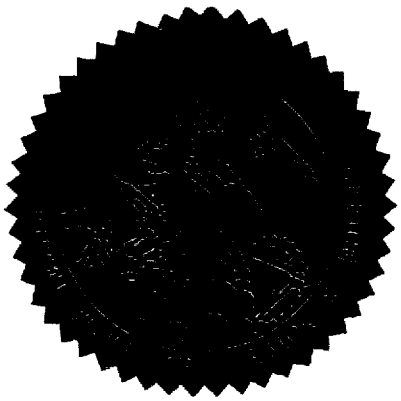

I have caused the seal of the Patent and Trademark Office to be affixed this third day of July 1989.

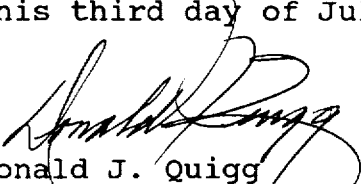

Donald J. Quigg
Assistant Secretary and Commissioner of Patents and Trademarks